Figure 1:
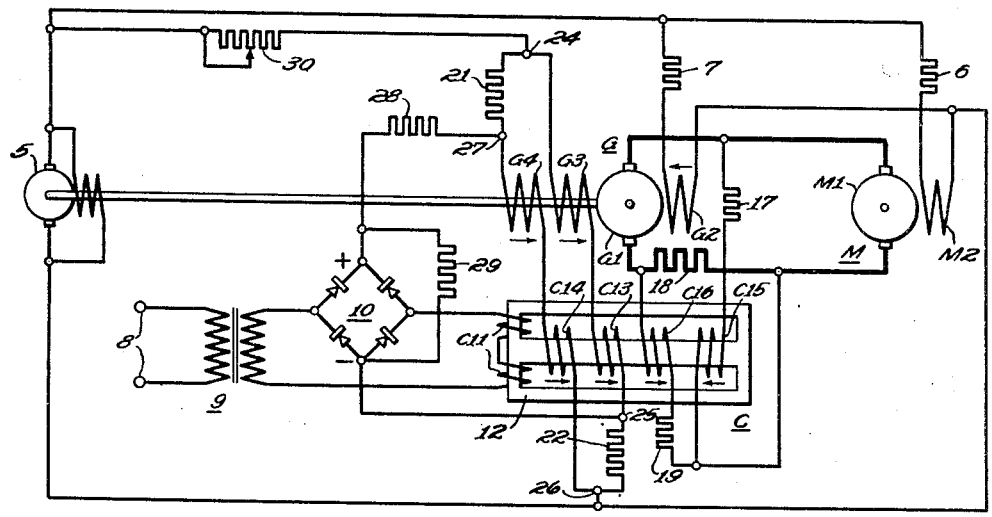

Aug. 22, 1950 G. E. KING 2,519,379
SATURABLE REACTOR CONTROL SYSTEM
Filed March 31, 1948 2 Sheets-Sheet 1

WITNESSES:
Robert C. Baird
Nw. C. Groome

INVENTOR
George E. King.
BY
ATTORNEY

Aug. 22, 1950  G. E. KING  2,519,379
SATURABLE REACTOR CONTROL SYSTEM
Filed March 31, 1948  2 Sheets-Sheet 2

WITNESSES:
Robert C Baird
Nw. C. Groome

INVENTOR
George E. King.
BY C. W. Amy
ATTORNEY

Patented Aug. 22, 1950

2,519,379

UNITED STATES PATENT OFFICE 2,519,379

SATURABLE REACTOR CONTROL SYSTEM

George E. King, Edgewood, Pa., assignor to Westinghouse Electric Corporation, East Pittsburgh, Pa., a corporation of Pennsylvania Application March 31, 1948, Serial No. 18,208

8 Claims. (Cl. 322—28)

My invention relates to control systems in which the field excitation of a dynamo-electric machine (hereinafter called "dynamo") is controlled or regulated by means of saturable reactance devices, and in one of its particular aspects to reactor-operated systems for controlling the voltage of a generator or the speed of a motor.

It is an object of my invention to devise a control system, using a saturable reactance device as a controlling or regulating member for a dynamo field circuit, which achieves a high amplification together with a high speed of response (small time constant) of the reactive control devices.

To this end, and in accordance with a feature of my invention, I connect a field winding of a dynamo to be controlled with a premagnetizing control coil of a saturable reactor whose variable reactance winding controls an alternating current voltage applied to a rectifier which, in turn, excites the dynamo field winding as well as the reactor control coil. I also excite the same or another field winding of the dynamo and the same or another control coil of the reactor from a separate source of normally constant direct-current voltage of adjustable magnitude (pattern voltage) so that the resultant field in the generator and the resultant control coil field in the reactor are due to the cumulative effects of the variable rectified voltage and the adjusted constant pattern voltage. I further equip the reactor with another control coil and excite the latter in opposition to the first control coil by a voltage (pilot voltage) variable in response to a condition controlled by the dynamo or indicative of its operation.

According to another feature of the invention, the above-mentioned organization is applied for controlling the field of the generator in an adjustable-speed drive of the Ward-Leonard type, and the variable pilot voltage is derived from the common armature circuit of generator and motor to regulate the generator field for substantially constant motor speed.

According to still another feature of the invention, I provide the dynamo, whose field is to be controlled, with two cumulative field windings and the reactor with two cumulative control coils, and connect one winding and one coil in one branch and the other winding and coil in an opposite branch of a bridge circuit whose two pairs of diagonal points are energized by the rectified voltage and the adjusted pattern voltage, respectively.

These and other features of the invention as well as the above-mentioned object and subsidiary objects will be apparent from the following description of the embodiments exemplified by the circuit diagrams shown in the drawings.

Figure 2A:
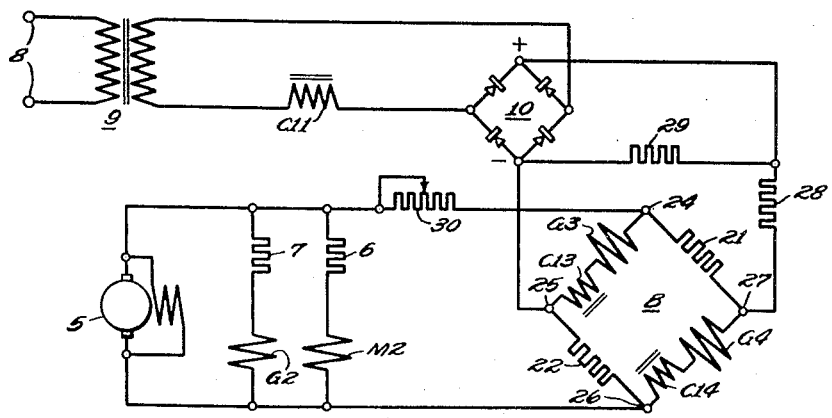
Figure 2B:
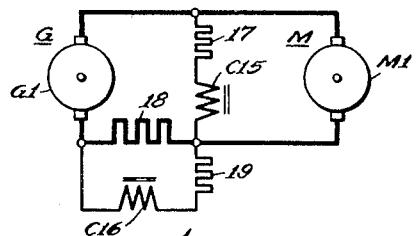

Figure 1 shows a speed-controlled variable-voltage drive including a motor M, a generator G and a control reactor C;

Figs. 2a and 2b show interrelated circuit diagrams which together represent the same drive as shown in Fig. 1. The illustration in Figs. 2a and 2b is in straight line fashion in order to facilitate tracing and understanding the electric circuits. However, magnetic associations are apparent from Figs. 2a and 2b from the fact that the reference numerals of elements appertaining to the generator are prefixed by G, numerals denoting elements of the motor are prefixed by M, and numerals appertaining to elements of the reactor are prefixed by C.

Figure 3:
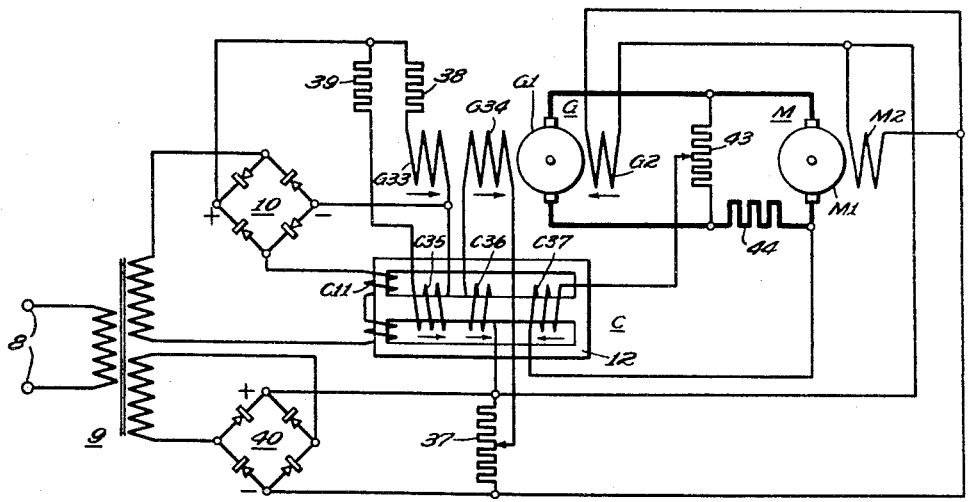
Figure 4:
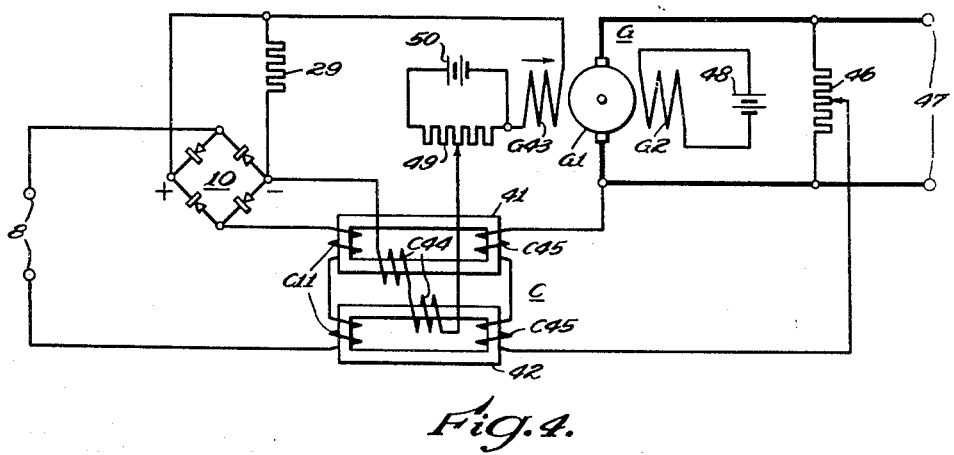

Fig. 3 shows another embodiment of a variable-voltage drive according to the invention; and Fig. 4 shows a system for controlling the output voltage of a generator.

In the system represented in Figs. 1, 2a and 2b, the armature of the motor to be controlled is denoted by M1 and the appertaining field winding by M2. The motor armature M1 is connected in a loop circuit with the armature G1 of the generator G. The generator has three field windings G2, G3 and G4.

Field windings M2 and G2 are energized from a direct-current source 5 of substantially constant voltage in series with respective field rheostats 6 and 7. The voltage source 5 is exemplified by an exciter whose armature may be driven together with the generator armature G1. However, any other suitable source of constant direct-current voltage may be used instead.

The system has terminals 8 for connection to an alternating-current source. These terminals are connected through a transformer 9 with the input terminals of a rectifier 10, in series with the main winding C11 of the reactor C. The reactor is shown to have a magnet core 12 of the three-legged type. The turns of the winding C11 are associated with the two outer legs in such a manner that substantially no alternating flux is induced in the center leg. The center leg is equipped with control coils C13, C14, C15 and C16 for providing the reactor with variable premagnetization. The reactive impedance of winding C11 depends upon the degree of premagnetization jointly caused by the control coils. When the premagnetization is zero, the reactance of winding C11 is a maximum so that the alternating voltage impressed on rectifier 10 is a minimum. When the premagnetization increases, the reactance of winding C11 is reduced, thereby increasing the output voltage of rectifier 10. The reactor operates along its ascending, unsaturated and substantially linear portion of its magnetic characteristic in order to secure approximate proportionality between the output voltage of rectifier 10 and the resultant excitation of the reactor control coils.

Coil C15 is connected across the armature circuit of the variable voltage drive, for instance, through a resistor 17. Coil C16 is connected across a resistor 18 which is series-connected in the load circuit, so that the excitation of coil C16 is proportional to the load current or IR drop of the armature circuit. A resistor 19 is series-connected in the circuit of coil C16.

Two resistors 21 and 22 are connected with control coils C13, C14 and field windings G3, G4 so as to form the four series-connected branches of a bridge circuit as is best apparent from Fig. 2a, in which the bridge circuit is denoted by B. Control coil C13 and field winding G3 are series-connected in one branch of the bridge circuit, while control coil C14 and field winding G4 are series-connected in the opposite branch, the two other branches being formed by the resistors 21 and 22. The resistance values of the four branches are substantially equal to one another.

The four diagonal points of the bridge circuit are denoted by 24, 25, 26 and 27. Diagonal points 25 and 27 are attached to the output terminals of rectifier 10 in series with a resistor 28 and in parallel with a load resistor 29. The voltage impressed across the terminal points 25 and 27 causes currents of equal values to flow through the bridge branches and thus provides a variable excitation for control coils C13, C14 and field windings G3 and G4. These coils and windings are wound and connected for cumulative performance. The cumulative premagnetizing effect of coils C13 and C14 on the reactor C represents a feed-back, because this component control excitation is proportional to the output voltage of rectifier 10 controlled by the reactor.

The diagonal points 24 and 26 of the bridge circuit are connected through a speed control rheostat 30 to the constant voltage source 5. The adjusted constant voltage (pattern voltage) impressed on the bridge circuit from source 5 also causes respective currents to flow through the four branches of the bridge circuit, thus superimposing another component excitation on coils C13, C14 and field windings G3, G4. This component excitation is cumulative to that resulting from the variable voltage of rectifier 10. Since the bridge circuit is balanced, the two voltages and respective excitation components do not affect each other and may vary independently of each other, the excitation of the coils and windings being always proportional to the sum of the two voltages.

The system operates in the following manner. When the speed control rheostat 30 is set for a desired motor speed, the generator being assumed to run at the proper speed and the voltage source 5 to be operative, the application of alternating-current voltage to terminals 8 has the effect of energizing the rectifier 10. The field winding G2 in generator G is differential to the field windings G3 and G4 in order to eliminate the effect of residual magnetism. Consequently, the generator voltage starts building up from zero at the moment when the terminals 8 are energized. At zero voltage of the generator, control coils C15 and C16 are not excited so that, at first, the cumulative coils C13 and C14 are alone effective. Coils C13 and C14 are energized by the pattern voltage in accordance with the adjustment of rheostat 30. Consequently, the initial premagnetization of the reactor is mainly determined by the pattern voltage and causes the rectifier 10 to apply increasing voltage to the generator field. The rectified current impresses also a feed-back voltage on coils C13 and C14, acting cumulatively with the pattern voltage. Thus, the premagnetization increases and the diminishing reactance of winding C11 rapidly approaches the condition at which the voltage from generator G causes the motor M to accelerate to the desired speed. Simultaneously, with the increase in generator voltage and motor speed, the control coil C15 becomes increasingly excited and bucks the control effect of windings C13 and C14. When the proper speed is reached, the control excitation of coils C13 and C14 is compensated or balanced by the differential excitation of coil C15 to the extent needed to maintain the reactor magnetization at the condition necessary for the winding C11 to hold the output voltage of rectifier 10 at the proper value.

The coil C16 imposes a corrective effect (IR drop compensation) on the control excitation in order to compensate for changes in motor terminal voltage due to variations in the load current. That is, an increased load, which would tend to reduce the motor speed below the correct value, causes a correspondingly increased excitation of coil C16 to be effective in cumulative relation to the excitation of coils C13 and C14, or in other words, the load-responsive excitation of coil C16 opposes and weakens the differential excitation of coil C15 to the extent needed to increase the generator voltage sufficiently for compensating the speed reduction.

It will be recognized from the foregoing that the system affords an accurate speed regulation regardless of variations in motor load so as to maintain the motor speed at a value dependent upon the setting of the rheostat 30. A change in the adjustment of rheostat 30 causes the motor speed to change accordingly and the speed is automatically regulated for the newly set value.

Due to the fact that a substantial proportion of the control premagnetization of reactor C is due to the feed-back voltage derived from rectifier 10, the system has the advantage of an extreme amplification. That is, slight variations in pattern voltage adjusted at rheostat 30 cause considerably larger and proportionate variations to occur across the rectifier output terminals. Any change in pattern voltage or feed-back voltage is simultaneously effective in the reactor control coils as well as in the generator field windings G3 and G4. Consequently, any change in speed adjustment effected at rheostat 30 while the system is in operation causes an anticipatory change of excitation to occur immediately in the generator field system before the system has reached the stable conditions corresponding to the new setting of the rheostat. Consequently, the system is also characterized by a high speed of response (short time constant) of control performance.

The variable voltage drive system according to the embodiment shown in Fig. 3 has a motor M whose armature M1 is loop connected with the armature G1 of the generator G. The motor field winding M2 and a field winding G2 of the generator are energized by normally constant voltage from a direct-current source here represented by a rectifier 40 energized from the alternating-current terminals 8 of the system through a transformer 9. Transformer 9 also energizes the rectifier 10 in series connection with the main winding C11 of a saturable reactor C. The generator has two additional field windings G33 and G34 cumulative to each other. Field winding G2 acts in opposition to the windings G33, G34 and its excitation has the magnitude required for eliminating residual magnetism. The reactor C is equipped with control coils C35, C36 and C37. Coils C35 and C36 are cumulative to each other and differential relative to coil C37.

Generator field winding G33 and control coil C35 are connected to the output terminals of rectifier 10. The connection may include resistors 38 and 39. Consequently, winding G33 and coil C35 are excited by variable voltage under control by the reactor winding C11. The excitation of coil C35 acts as a feed-back, that is, it serves to increase the amplification factor of the reactor system. While a parallel connection of coil C35 to winding G33 is shown, a series connection may be employed instead, depending upon the desired time constant of control.

Field winding G34 and control coil C36 are connected to the constant voltage source 40 through a potentiometric rheostat 41 to be energized by a normally constant pattern voltage whose value is adjusted by rheostat 37 in accordance with the desired motor speed.

The armature circuit of motor M includes a series resistor 44 and has a parallel resistor 43. Control coil C37 is connected across the resistor 42 in series with a tapped-off portion of resistor 43. The excitation of coil 37 is proportional to the differential value of two voltage drops. One voltage drop is taken from across the tapped-off portion of resistor 43 and is proportional to the terminal voltage of the motor armature. The second voltage drop is taken from across resistor 42 and is proportional to the current or IR drop in the armature circuit. By properly dimensioning the ratio of the two voltage drops, the resultant excitation of field winding C37 can be adjusted to be substantially proportional to the counter EMF of motor M and hence to the motor speed.

The system according to Fig. 3 operates basically in a manner similar to the above-described performance of the system shown in Fig. 1. It will be recognized, however, that in the system of Fig. 3, the functions of providing feed-back excitation and pattern excitation are assigned to separate control windings (C35, C36) of the reactor, and that the reactor controlled field excitation and the pattern excitation are applied to separate field windings (G33, G34) of the generator. Also, a single control coil (C37), excited in proportion to the motor speed, takes the place of two control coils (C15, C16) of the system shown in Fig. 1.

The system shown in Fig. 4 in a simplified manner serves to regulate the output voltage of a generator G for an adjusted constant value. The saturable reactance device shown in Fig. 4 consists of two units each having a magnet core 41 or 42 with an undivided magnetic circuit. The main winding of the reactor has equal numbers of turns disposed on the cores 41 and 42, respectively, and is series-connected with the rectifier 10 across the alternating-current terminals 8 of the system. The generator G has a control field winding G43 which is series-connected with two sections of a control coil C44 that are associated with the respective reactor cores 41 and 42. The two sections of coil C44 have equal numbers of turns and are so poled that the secondary voltage induced in one section by the flux of the main winding C11 is substantially balanced by the secondary voltage induced in the other coil section. The reactor cores 41 and 42 are further equipped with two sections of a control winding C45 which are likewise so dimensioned and poled that the secondary voltages induced by the main winding C11 substantially cancel each other. Coil C45 produces in each core a premagnetizing flux differentially related to that produced by coil C44. A rheostat 46 is connected across the output terminals 47 of the generator armature G1. Coil 45 is connected across a tapped-off portion of resistor 46 to be excited by pilot voltage proportional to the output voltage of generator G. The generator has another field winding G2 excited by constant voltage from a suitable current source 48 and connected to operate in opposition to the field winding G43 in order to eliminate residual magnetism.

The common circuit of generator field winding G43 and reactor control coil C44 extends in series through a rheostat 29 connected across the output terminals of rectifier 10 and through a portion of a potentiometric rheostat 49 energized from a suitable direct-current source 50 of substantially constant voltage. Consequently, two voltages are cumulatively imposed on the circuit. One voltage is proportional to the reactor-controlled output voltage from rectifier 10 and the other voltage (pattern voltage) has a normally constant value adjusted by the rheostat 49 in accordance with a desired generator output voltage.

It will be recognized that the sections of coil C44 provide feed-back excitation from the rectifier 10 in order to secure a high amplification factor and also provide the pattern excitation necessary for adjusting the reactance. The generator field winding G43 is likewise subjected to the cumulative and simultaneous effects of the rectified voltage and the pattern voltage. When the generator is running and alternating voltage is placed on terminals 8, the armature voltage of generator G builds up to a value determined by the reactor premagnetization adjusted by the rheostat 49 and amplified by the feed-back effect. As the generator voltage builds up, the differential excitation of coil C45 increases and bucks the premagnetizing flux of the control coil C44. When the correct generator voltage is reached, the resultant premagnetization of the reactor cores has the value required for maintaining the output voltage of rectifier 10 at the proper value. Any departure of the generator output voltage from the value determined by the setting of rheostat 48 causes the control coil C45 to increase or decrease the differential premagnetizing flux with the result of changing the reactive impedance of winding C11 in the sense and by the magnitude required to cause the output voltage of rectifier 10 to restore the desired conditions.

It will be understoood by those skilled in the art that systems according to the invention can be modified in various ways and with respect to various system components and connections without departing from the essential features of the invention as set forth in the claims annexed hereto.

I claim as my invention:

1. A dynamo control system, comprising a dynamo having two cumulative field windings, a saturable reactor and a rectifier series-connected with each other, said reactor having two cumulative control coils and control winding means for jointly controlling the output voltage of said rectifier, said winding means being differentially related to said control coils, direct-current supply means of adjustable voltage, a bridge circuit having four loop-connected branches and two pairs of diagonal points between said branches, each of two opposite branches comprising one of said field windings and one of said control coils, one pair of said diagonal points being connected to said supply means, the other pair of diagonal points being connected across the output side of said rectifier, and condition-responsive direct-current supply means connected to said control winding means for impressing thereon a variable voltage dependent upon a condition controlled by said dynamo.

2. A dynamo control system, comprising a dynamo having an armature circuit and two cumulative field windings, a saturable reactor and a rectifier series-connected with each other, said reactor having two cumulative control coils and control winding means for jointly controlling the output voltage of said rectifier, said winding means being differentially related to said control coils, direct-current supply means of adjustable voltage, a bridge circuit having four loop-connected branches and two pairs of diagonal points between said branches, each of two opposite branches comprising one of said field windings and one of said control coils, one pair of said diagonal points being connected to said supply means, the other pair of diagonal points being connected across the output side of said rectifier, and circuit means connecting said armature circuit with said control winding means to impress thereon a variable voltage dependent upon an operating condition of said dynamo.

3. A dynamo control system, comprising a generator having an armature circuit and two cumulative field windings for variable excitation and another field winding disposed for constant excitation and differentially related to said cumulative field windings, a saturable reactor and a rectifier series-connected with each other, said reactor having two cumulative control coils and control winding means for jointly controlling the output voltage of said rectifier, said winding means being differentially related to said control coils, direct-current supply means of adjustable voltage, a bridge circuit having four loop-connected branches and two pairs of diagonal points between said branches, each of two opposite branches comprising one of said field windings and one of said control coils, one pair of said diagonal points being connected to said supply means, the other pair of diagonal points being connected across the output side of said rectifier, and said control winding means being connected to said armature circuit to be impressed by variable voltage substantially proportional to the generator output voltage.

4. A dynamo control system, comprising a dynamo to be controlled having two cumulative control field windings, a saturable reactor having a main winding of variable reactance and having direct-current premagnetizing coils including two cumulative coils and at least one other coil differentially related to said cumulative coils, alternating-current supply terminals, a rectifier having output terminals and having input terminals connected to said supply terminals in series with said main winding, direct-current supply means of adjustable voltage, a bridge circuit having four loop-connected branches of substantially equal resistance and two pairs of diagonal points between said branches, each of two opposite branches comprising one of said field windings and one of said control coils, one pair of said diagonal points being connected to said supply means, the other pair of diagonal points being connected across said rectifier output terminals and condition-responsive direct-current supply means connected to said control winding means for impressing thereon a variable voltage dependent upon a condition controlled by said dynamo.

5. A dynamo control system, comprising a generator having an armature circuit and two cumulative control field windings, a saturable reactor having a main winding of variable reactance and having direct-current premagnetizing coils including two cumulative coils and at least one other coil differentially related to said cumulative coils, alternating-current supply terminals, a rectifier having output terminals and having input terminals connected to said supply terminals in series with said main winding, direct-current supply means of adjustable voltage, a bridge circuit having four loop-connected branches of substantially equal resistance and two pairs of diagonal points between said branches, each of two opposite branches comprising one of said field windings and one of said control coils, one pair of said diagonal points being connected to said supply means, the other pair of diagonal points being connected across said rectifier output terminals, and circuit means connected to said armature circuit to provide a variable voltage substantially proportional to the terminal voltage of said armature circuit and connected across said other pair of diagonal points.

6. A dynamo control system, comprising a generator having an armature circuit and two cumulative field windings, a saturable reactor and a rectifier series-connected with each other, said reactor having two cumulative control coils and control winding means for jointly controlling the output voltage of said rectifier, direct-current supply means of adjustable voltage, a bridge circuit having four loop-connected branches and two pairs of diagonal points between said branches, each of two opposite branches comprising one of said field windings and one of said control coils, one pair of said diagonal points being connected to said supply means, the other pair of diagonal points being connected across the output side of said rectifier, said control winding means having two circuits, one of said circuits being connected in parallel relation to said armature circuit to provide control excitation dependent upon the voltage across said armature circuit and being poled for differential control action relative to said control coils, said other control circuit being connected in series relation to said armature circuit and poled to provide excitation proportional to the IR drop in said armature circuit and cumulative to that of said control coils.

7. A dynamo control system, comprising a dynamo having a control field winding, alternating-current supply terminals, a rectifier, a saturable reactor having a main winding connected to said terminals in series with said rectifier, said reactor having two mutually differential direct-current coils for controlling the output voltage of said rectifier, direct-current supply means of substantially constant voltage having a rheostat for adjusting said voltage, said field winding and one of said coils having a common excitation circuit connected with said rectifier and with said rheostat to be excited by the resultant effect of said rectifier output voltage and said adjusted constant voltage, said other coil being connected to said dynamo to be excited by variable voltage in dependence upon an operating condition of said dynamo.

8. A dynamo control system, comprising a generator having an armature circuit and a control field winding, alternating-current supply terminals, a rectifier, a saturable reactor having a main winding connected to said terminals in series with said rectifier, said reactor having two mutually differential direct-current coils for controlling the output voltage of said rectifier, direct-current supply means of substantially constant voltage having a rheostat for adjusting said voltage, said field winding and one of said coils having a common excitation circuit connected with said rectifier and with said rheostat to be excited by the resultant effect of said rectifier output voltage and said adjusted constant voltage, said other coil being connected to said armature circuit to be excited substantially in dependence upon the terminal voltage of said armature circuit.

GEORGE E. KING.

REFERENCES CITED

The following references are of record in the file of this patent:

UNITED STATES PATENTS

| Number | Name | Date |
|---|---|---|
| 2,140,349 | Dawson | Dec. 13, 1938 |
| 2,286,370 | Miller | June 16, 1942 |
| 2,435,573 | Bixby | Feb. 10, 1948 |